(12) United States Patent
Frankel

(10) Patent No.: US 7,699,575 B2
(45) Date of Patent: *Apr. 20, 2010

(54) LOADING ASSEMBLY FOR TRANSPORT CONTAINERS AND RELATED METHOD OF USE

(76) Inventor: Nathan Frankel, 342 N. Mansfield, Los Angeles, CA (US) 90036

( * ) Notice: Subject to any disclaimer, the term of this patent is extended or adjusted under 35 U.S.C. 154(b) by 0 days.

This patent is subject to a terminal disclaimer.

(21) Appl. No.: 11/934,617

(22) Filed: Nov. 2, 2007

(65) Prior Publication Data

US 2008/0038100 A1  Feb. 14, 2008

Related U.S. Application Data

(63) Continuation of application No. 11/424,846, filed on Jun. 16, 2006, now Pat. No. 7,588,406, which is a continuation-in-part of application No. 10/964,384, filed on Oct. 12, 2004, now Pat. No. 7,172,382.

(51) Int. Cl.
  *B65F 9/00* (2006.01)
  *B65G 67/00* (2006.01)
(52) U.S. Cl. ................ 414/395; 414/288; 414/328; 414/416.03
(58) Field of Classification Search ............... 414/403, 414/404, 395, 416.01, 416.03, 416.04, 288, 414/304, 140.3, 142.2, 143.2, 280, 352
See application file for complete search history.

(56) References Cited

U.S. PATENT DOCUMENTS 2,711,835 A  6/1955  Kappen
2,849,129 A  8/1958  Liken
2,856,086 A  10/1958  Balbi (Continued)

FOREIGN PATENT DOCUMENTS

DE  1927654  12/1970

(Continued)

OTHER PUBLICATIONS

International Search Report and Written Opinion from International App. No. PCT/US2007/014291.

*Primary Examiner*—Gregory W Adams
(74) *Attorney, Agent, or Firm*—Greenberg Traurig LLP

(57) ABSTRACT

A loading assembly is provided that is configured to load transport containers with bulk material quickly and efficiently. A container support assembly is also provided that facilitate alignment and stable support of the container throughout loading. In use, a load bin of the loading assembly is inserted and retracted relative to the container by a drive mechanism. The barrier assembly confines the contents of the load bin in the container while the bin is retracted, allowing the contents of the bin to remain within the container upon removal of the bin. The container support assembly includes left and right ramps disposed along side the container. The ramps each include a support surface having an increasing height differential with reference to the ground from the distal end to the proximal end. The support assembly further includes an interface assembly configured to attach to the container and to engage the support surfaces of the left and the right ramps to distribute load onto the ramps. Thus, with the container properly positioned, a substantial portion of the container's load is borne by the ramps.

9 Claims, 14 Drawing Sheets

U.S. PATENT DOCUMENTS

| | | | |
|---|---|---|---|
| 3,040,914 A | 6/1962 | Johnson et al. | |
| 3,175,708 A | 3/1965 | Felts | |
| 3,186,566 A | 6/1965 | Spinanger et al. | |
| 3,220,586 A | 11/1965 | Gollnick | |
| 3,252,602 A | 5/1966 | Bowles | |
| 3,273,728 A | 9/1966 | Kelso | |
| 3,456,825 A | 7/1969 | Lacoe, Jr. | |
| 3,616,957 A | 11/1971 | Patton | |
| 3,667,635 A | 6/1972 | Hackney | |
| 3,688,926 A | 9/1972 | Stefanelli | |
| 3,727,777 A | 4/1973 | Hanson | |
| 3,780,893 A | 12/1973 | Lassig et al. | |
| 3,815,764 A | 6/1974 | Gilfillan et al. | |
| 3,938,678 A | 2/1976 | Kern | |
| 3,952,887 A | 4/1976 | Lutz | |
| 3,966,075 A | 6/1976 | Schultz | |
| 4,011,957 A | 3/1977 | Bendtsen | |
| 4,016,991 A | 4/1977 | Oldford | |
| 4,020,958 A | 5/1977 | Wheeler | |
| 4,044,899 A | 8/1977 | Booher | |
| 4,125,196 A | 11/1978 | Lieberman et al. | |
| 4,260,317 A | 4/1981 | Martin et al. | |
| 4,522,556 A | 6/1985 | Shapiro | |
| 4,537,554 A * | 8/1985 | Collins, Jr. | 414/328 |
| 4,645,406 A | 2/1987 | Cooper et al. | |
| 4,805,852 A * | 2/1989 | Nordstrom | 244/137.1 |
| 4,919,582 A | 4/1990 | Bates et al. | |
| 4,923,356 A | 5/1990 | Foster | |
| 4,976,365 A | 12/1990 | Seo | |
| 5,026,228 A | 6/1991 | Mansfield | |
| 5,040,938 A | 8/1991 | Gearin et al. | |
| 5,054,987 A | 10/1991 | Thornton | |
| 5,082,415 A | 1/1992 | Hayashi | |
| 5,116,183 A * | 5/1992 | Lee | 414/395 |
| 5,186,596 A | 2/1993 | Boucher et al. | |
| 5,193,968 A | 3/1993 | Hicks | |
| 5,527,147 A | 6/1996 | Hulls | |
| 5,564,767 A | 10/1996 | Strepek | |
| 5,711,566 A | 1/1998 | Lesmeister et al. | |
| 6,048,167 A | 4/2000 | Lesmeister et al. | |
| 6,138,557 A | 10/2000 | Brown et al. | |
| 6,168,371 B1 | 1/2001 | Lesmeister et al. | |
| 6,312,206 B1 | 11/2001 | Pylate et al. | |
| 6,427,585 B1 | 8/2002 | Brown et al. | |
| 7,172,382 B2 | 2/2007 | Frankel | |
| 2002/0094258 A1 | 7/2002 | Iwasaki et al. | |
| 2003/0047561 A1 | 3/2003 | Neto | |
| 2006/0285949 A1 * | 12/2006 | Frankel | 414/409 |

FOREIGN PATENT DOCUMENTS

| | | |
|---|---|---|
| DE | 2635268 | 2/1978 |
| DE | 3530321 | 3/1987 |
| EP | 056928 | 12/1985 |
| EP | 0655403 | 6/1995 |
| EP | 1321398 | 6/2003 |
| JP | 56033315 | 4/1981 |
| WO | 83/00320 | 2/1983 |
| WO | WO 03080481 | 10/2003 |

* cited by examiner

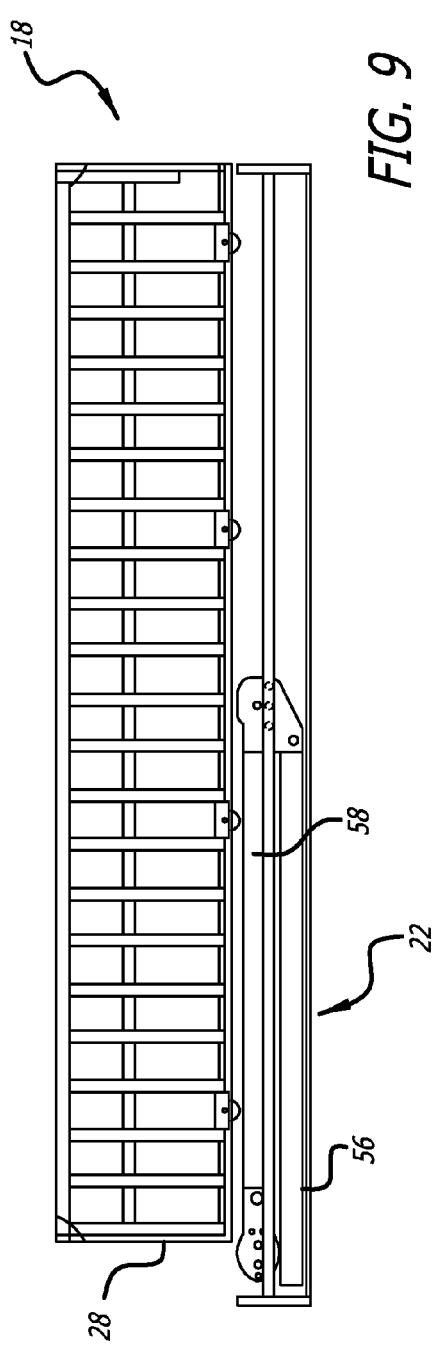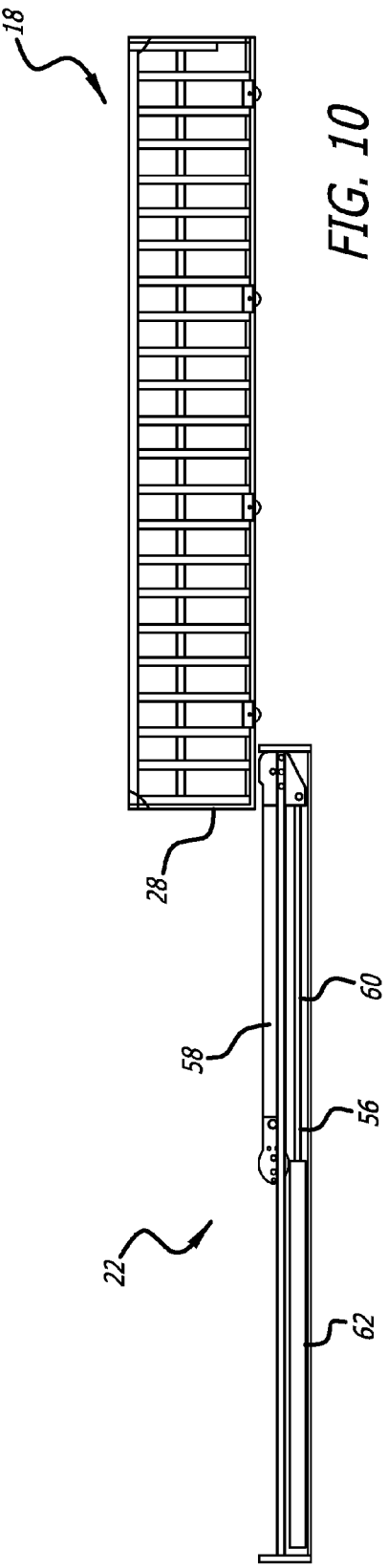

LOADING ASSEMBLY FOR TRANSPORT CONTAINERS AND RELATED METHOD OF USE

RELATED APPLICATIONS

This application is a continuation of U.S. patent application Ser. No. 11/424,846, filed Jun. 16, 2006, which is a continuation-in-part of U.S. patent application Ser. No. 10/964,384, filed on Oct. 12, 2004, now U.S. Pat. No. 7,172,382, the contents of which are incorporated by reference herein in their entireties.

BACKGROUND

The present invention relates generally to assemblies for loading containers and, more particularly, to assemblies for loading transport containers with bulk materials. The present invention further relates to container supports for use in loading transport containers.

Efficient trade is highly dependent upon standardization of freight, including size and weight requirements. Such standards allow common carriers, e.g., train, semi-tractor trailers, and water vessels, to optimize space and to streamline loading and unloading of cargo. As a result, common carriers typically provide lower rates for freight housed in standard transport containers. Transport containers conforming to prescribed standards are ubiquitous in commerce, particularly international trade. Such transport containers include standard 40-ft. containers, 40-foot, high-cube containers, and standard 20-foot containers, having dimensions set forth in Table 1, as follows:

TABLE 1

| Exemplary Container Dimensions (approx.) | | | | | |
|---|---|---|---|---|---|
| Outside Dimensions | | | Inside Dimensions | | |
| Length | Width | Height | Length | Width | Height |
| Std. 40-ft. Containers | | | | | |
| 40 ft. | 8 ft. | 8 ft. 6 in. | 39 ft. 6 in. | 7 ft. 8 in. | 7 ft. 10 in. |
| 12.192 m | 2.438 m | 2.591 m | 12.040 m | 2.337 m | 2.387 m |
| 40-ft. High-Cube Containers | | | | | |
| 40 ft. | 8 ft. | 9 ft. 6 in. | 39 ft. 6 in. | 7 ft. 8 in. | 8 ft. 9 in. |
| 12.192 m | 2.438 m | 2.896 m | 12.040 m | 2.337 m | 2.667 in. |
| Std. 20-ft. Container | | | | | |
| 20 ft. | 8 ft. | 8 ft. 6 in. | 20 ft. | 7 ft. 8 in. | 7 ft. 10 in. |
| 6.096 m | 2.438 m | 2.591 m | 6.096 m | 2.337 m | 2.387 m |

Notably, the dimensions of these containers are configured to facilitate transport of multiple containers in both sizes on the same means of transportation. Shipping freight in non-standard containers can greatly increase costs. Thus, to control costs, it is beneficial to load cargo into standard transport containers. To load a container efficiently, current loading approaches typically require that the items be palletized. For many types of cargo, this approach is very efficient and economical.

However, palletizing a load of many types of bulk materials, such as scrap metal, often is unfeasible, particularly since such bulk materials are non-uniform in shape. Instead, such bulk materials commonly are carried into the container with skid-steer loaders and dumped in place. Once loaded, such transport containers often transferred to transport vehicles, e.g., tractor/trailers, railroad cars and so on.

Although skid-steer loaders are generally effective in transferring bulk materials, loading a container in this manner has a number of shortfalls. The confined space of the container limits the size of the skid-steer loader that can be used, requiring many trips to load the container. Such loaders have great difficulty stacking material beyond a certain height within the container. To dispense its load, the loader's bucket is lifted in proximity to the container's ceiling and, then, tipped downward to dump its load. Thus, loading the container to capacity can be challenging and time consuming. Moreover, due in part to the precision required in operating the loader, any operator error poses a likely risk of damage to the container as well as potential worker injury.

It should be appreciated that there remains a need for a loading assembly that addresses these concerns. The present invention fulfills this need and others.

SUMMARY

In general terms, the present invention provides a loading assembly for use with transport containers having an open end. The assembly includes a load bin that is inserted and retracted by a drive mechanism. The assembly further includes a barrier assembly configured to confine the contents of the load bin in the container while the bin is retracted, allowing the contents of the bin to remain within the container upon removal of the bin. A container support assembly, is positioned to support the container during loading. The support assembly includes left and right ramps disposed along side the container. The ramps each include a support surface having an increasing height differential with reference to the ground from the distal end to the proximal end. The support assembly further includes an interface assembly configured to attach to the container and to engage the support surfaces of the left and the right ramps to distribute load onto the ramps. Thus, with the container property positioned, a substantial portion of the container's load is borne by the ramps. Moreover, the container support assembly aid in alignment of the container with respect to the loading assembly.

More specifically, and by way of example, the load bin defines a volume configured to hold a load of sufficient size to fill the container to capacity in a single operation. The loading assembly also includes a support structure having a base support disposed below the load bin and a drive mechanism configured to enable displacement of the load into the container through the open end thereof and to retract the load bin from the container following displacement. A barrier assembly is configured to engage the support structure such that it locks in place adjacent to the open end of the container during retraction of the load bin, allowing the contents of the bin to remain within the container during and after removal of the bin.

In a detailed aspect of an exemplary embodiment of the invention, the load bin includes a floor, two side walls, an end wall, and a movable front wall. The load bin is preferably configured to hold a load of sufficient size at least to meet the capacity of the container to include volume and weight. Also, the loading assembly is operable until a load in excess of 22,000 pounds. The front wall of the load bin can include a door that opens to allow the load to exit the load bin upon retraction thereof thereby allowing the load to remain within the container.

In distinct and independent aspect of the inventions a container support assembly for use with transport containers is provided. The support assembly includes left and right ramps disposed along side the container. The ramps each include a support surface having an increasing height differential with reference to the ground from the distal end to the proximal end. The support assembly further includes an interface assembly configured to attach to the container and to engage the support surfaces of the left and the right ramps to distribute load onto the ramps.

In an exemplary embodiment of the invention, the interface assembly includes a roller assembly having a left roller configured to engage the support surface of the left ramp and a right roller configured to engage the support surface of the right ramp. The interface assembly can further include a corner assembly configured to couple to the transport container.

In a detailed aspect of an exemplary embodiment the interface assembly includes a roller assembly having a left roller configured to engage the support surface of the left ramp and a right roller configured to engage the support surface of the right ramp, and the interface assembly further includes a corner assembly configured to couple to the transport container and to engage the roller bar. The roller assembly can further include left and right vertical rollers positioned to each of the ramps.

In a detailed aspect of an exemplary embodiment, the support surfaces of the left and the right ramps are inclined with reference to the ground between the ramps.

In another detailed aspect of an exemplary embodiment, the ground between the ramps declines with reference to the support surfaces of the left and the right ramps.

In yet another detailed aspect of an exemplary embodiment, the left and the right corner assemblies both include a body, an end support bar configured to be received within an end opening in the corresponding corner of the container, and a side support bar configured to be received within a side opening in the corresponding corner of the container. A lever can be provided to engage and disengage at least one of the support bars from the corresponding opening of the container.

For purposes of summarizing the invention and the advantages achieved over the prior art certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

DRAWINGS

Embodiments of the present invention will now be described, by way of example only, with reference to the following drawings in which:

FIG. 9 is a side elevational view of the drive mechanism and load bin of the loading assembly of FIG. 1, depicting the load bin retracted.

FIG. 10 is a side elevational view of the drive mechanism and load bin of the loading assembly of FIG. 1, depicting the load bin fully extended.

DETAILED DESCRIPTION

Figure 1:
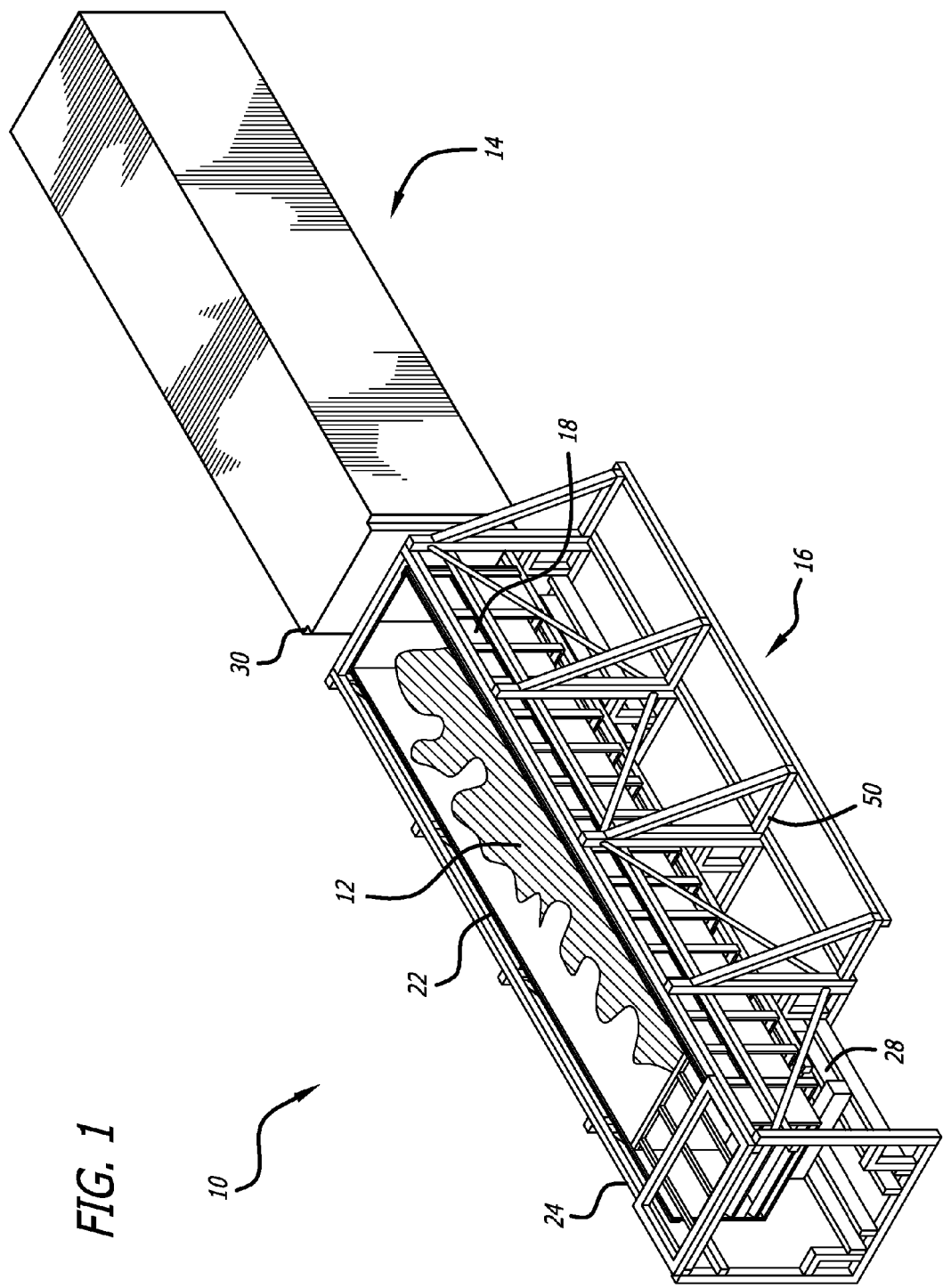
FIG. 1 is a perspective view of a loading assembly in accordance with the present invention, depicting a load bin of the loading assembly aligned with an opening of a transport container, further depicting a container support assembly in accordance with a distinct and independent aspect of the invention.

Referring now to the drawings, and particularly to FIG. 1, there is shown a loading assembly 10 configured to load bulk material 12, e.g., scrap metal, into a transport container 14. A container support assembly 110 is provided about the open end of the container to facilitate alignment and stable support of the container 14 throughout the loading process, which is discussed in detail below following a discussion of the loading assembly.

Loading Assembly

The loading assembly 10 includes a support structure 16 and a load bin 18 sized to conform to the internal dimensions of the container. The load bin has an open top 21, allowing it to be top-loaded to facilitate efficient loading of bulk material. The assembly includes a drive mechanism 22 (FIG. 9) configured to urge the load bin into and out of the container. When fully inserted, the contents of the load bin are completely disposed with in the container. The loading assembly further includes a barrier assembly 24 configured to keep the load confined within the container and a gate 26 that allows the bulk material to exit the load bin upon retraction. In this manner, the container can be loaded to capacity with bulk material quickly and efficiently.

FIGS. 1-4 depict sequential operation of the loading assembly 10, with the container 14 in phantom for visibility. The loading assembly operates through several phases, including material loading (FIG. 1), transfer (FIG. 2), and retraction (FIGS. 3 and 4), thereby loading the container to capacity in a single operation. During the loading phase, the load bin 18 is preferably disposed within the support structure 16, allowing the load bin to be top loaded, even while aligned with the container. The load bin is filled with bulk material 12 up to a desired level. For example, the load assembly can be used with both 20-ft. and 40-ft. containers. When loading a 20-ft. container, the barrier 24 can be positioned at a midpoint along the load bin, thereby defining in volume that conforms to the internal volume of a 20-ft. container. When loading a 40-ft. container, the barrier is positioned at an end wall 28 of the load bin. Operators can fill the load bin with bulk material via the open top 21, as desired.

Figure 3:
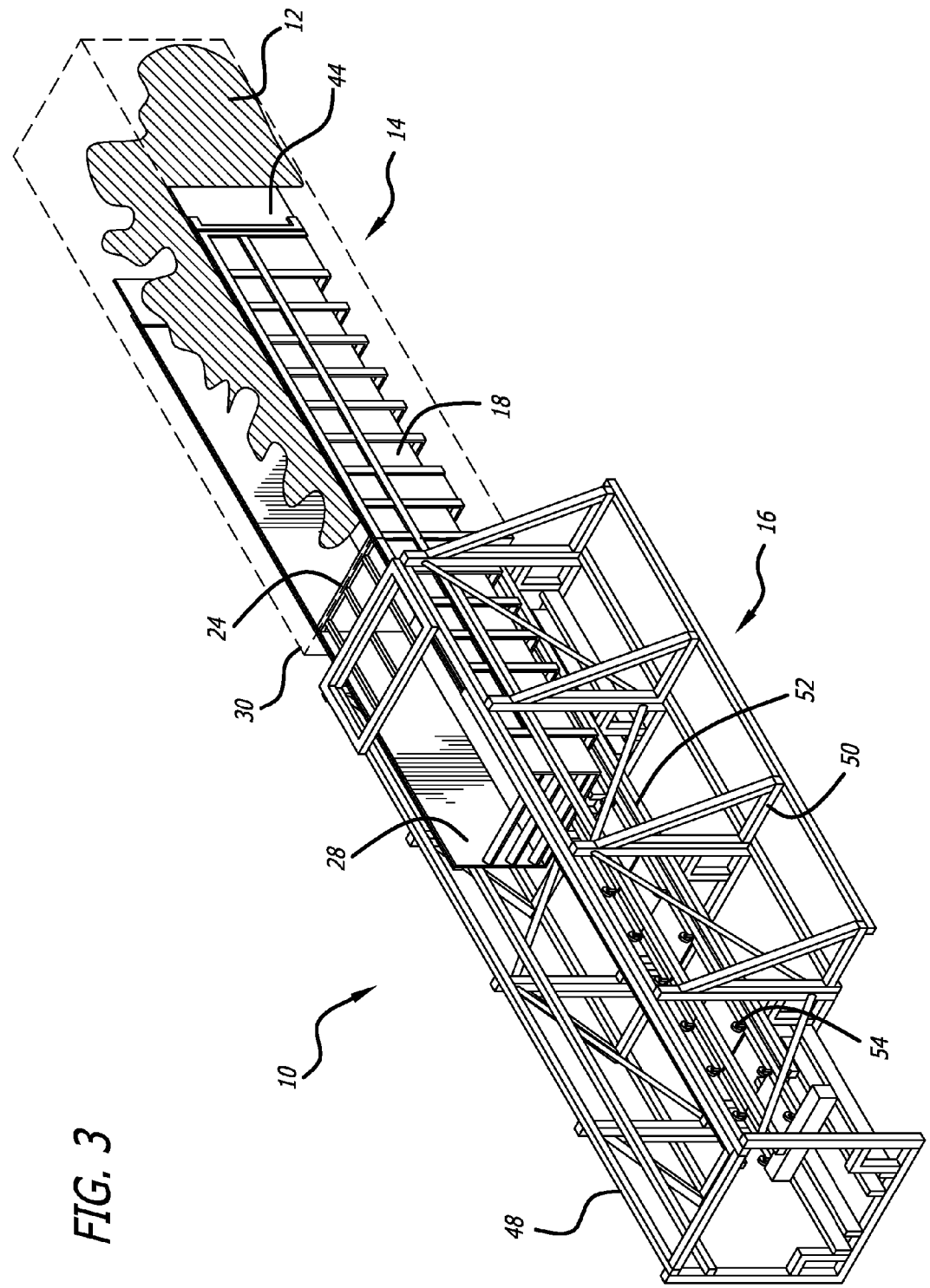
FIG. 3 is a perspective view of the loading assembly of FIG. 1, depicting the load bin partially withdrawn from the container (in phantom) and having a gate of the bin open.
Figure 4:
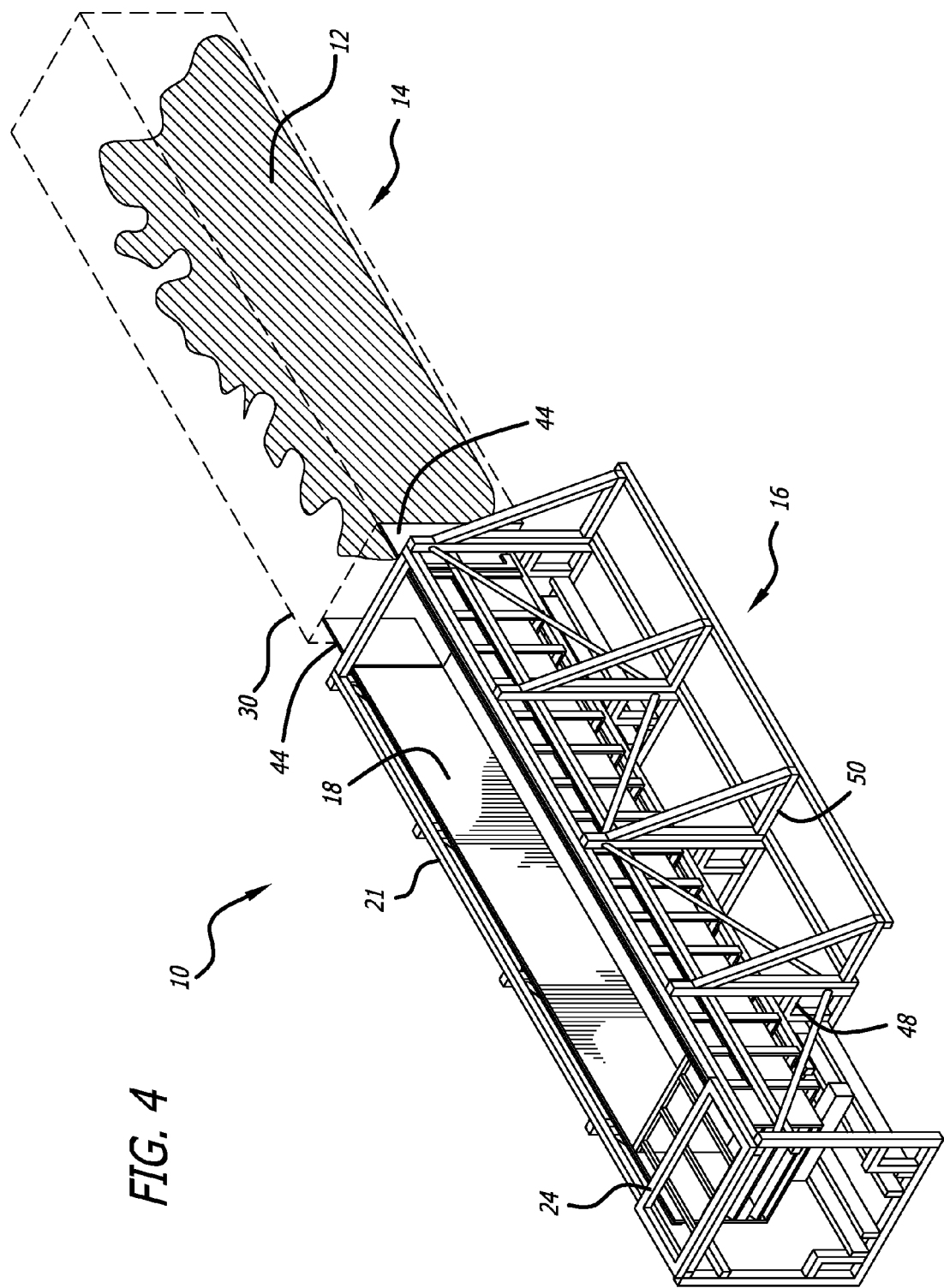
FIG. 4 is a perspective view of the loading assembly of FIG. 1, depicting the load bin fully withdrawn from the container (in phantom).

Once loaded, the transfer phase can be initiated. In this phase, the drive mechanism 22 urges the load bin 18 into the container 14. This phase continues until the contents of the load bin are fully disposed within the container. When desired, the load bin can then be retracted, leaving the bulk material 12 within the container. As best seen in FIG. 3, during the retraction phase, the gate 26 is unlocked, and the barrier 24 remains positioned against an open end 30 of the container. The drive mechanism retracts the load bin from the container until the bin is removed from the container (FIG. 4), at which point the container is free for transport.

Figure 5:
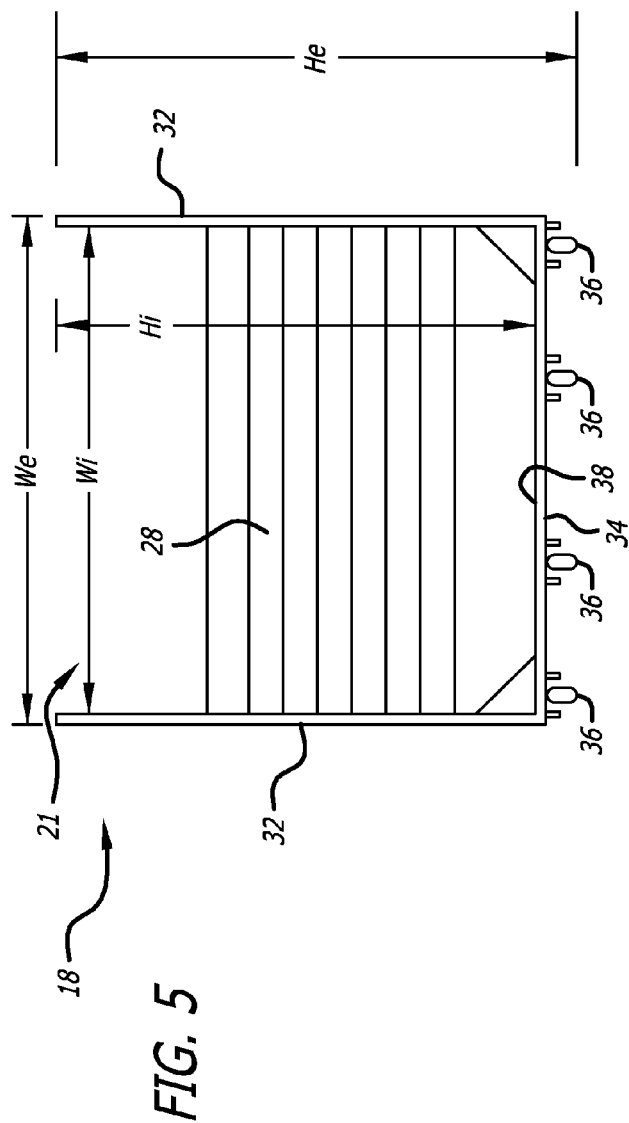
FIG. 5 is a front elevational view of the load bin of the loading assembly of FIG. 1, with the gate excluded for clarity.
Figure 6:
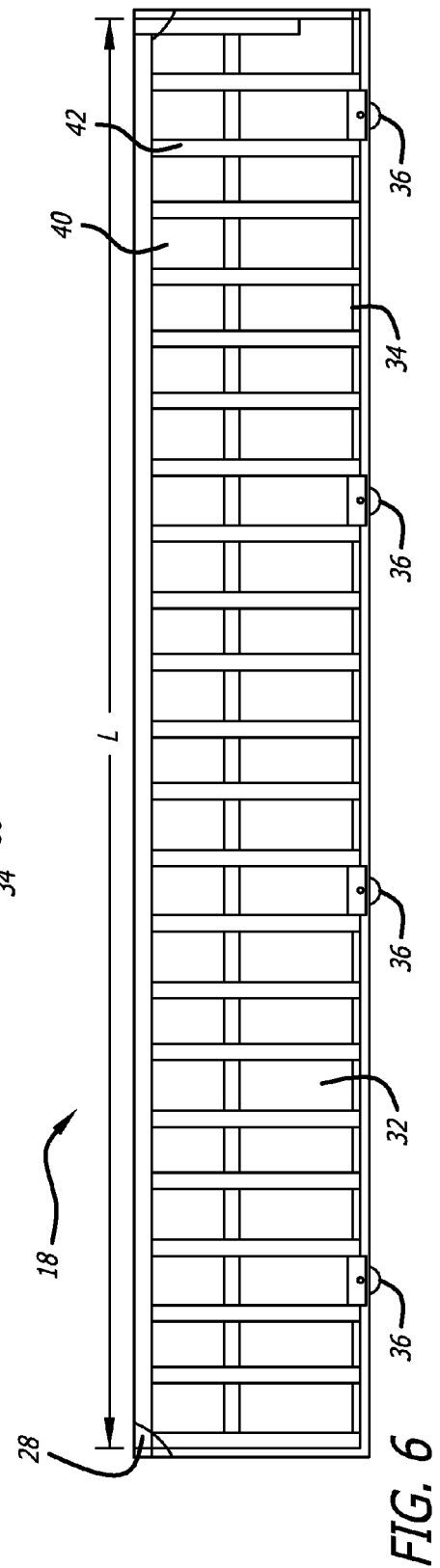
FIG. 6 is a side elevational view of the load bin of the loading assembly of FIG. 1.

With reference to FIGS. 1, 5 and 6, the load bin 18 includes sidewalls 32, a bottom wall 34, and the wall 28 spaced from the gate 26. In the exemplary embodiment, the load bin is sized to conform to the internal dimensions of typical 20-ft. or 40-ft. transport containers. More particularly, the load bin has an external height ($H_e$) of about 7 ft., an external width ($W_e$) of about 7 ft., 5 in., and a length (L) of about 44 ft., 4 in. The load bin has an internal height ($H_i$) of about 6 ft. 10 in., an external width ($W_i$) of about 7 ft., 4 in. The load bin also includes rollers 36 along the bottom wall to aid in smooth movement of the bin along the container, to include along a floor 20 of the container.

Other embodiments are contemplated having a load bin sized to conform to containers of various other sizes, e.g., railroad cars, storage containers, and semi trailers. The load bin can be loaded to capacity easily with bulk material, and it can effectively hold bulk material having a high degree of variability in make-up. For example, the load bin can hold a single load of scrap steel having pieces varying size from as small as 0.01 in. by 1 in. by 0.25 in. (0.25 mm by 25 mm by 0.635 mm) up to and in excess of 5 ft. by 3 ft. by 1 ft. (1.52 m by 0.91 m by 0.3 m).

To facilitate operation of the loading assembly 10, interior surfaces 38 of the load bin 18 are relatively smooth, free of excessive ridges and grooves, such that the load bin can be retracted without having bulk material unduly catching the surface, particularly during retraction. In the exemplary embodiment, the walls of the load bin include steel paneling 40 supported by reinforcing beams 42 spaced along the length of the load bin. The interior surfaces are defined by the paneling to the walls of the load bin. Optionally, supplemental materials or coatings can be used for the interior surfaces to facilitate retraction of the load bin. For example, in other embodiments, the load bin can include rollers disposed along interior surfaces to facilitate loading of the container.

Figure 7:
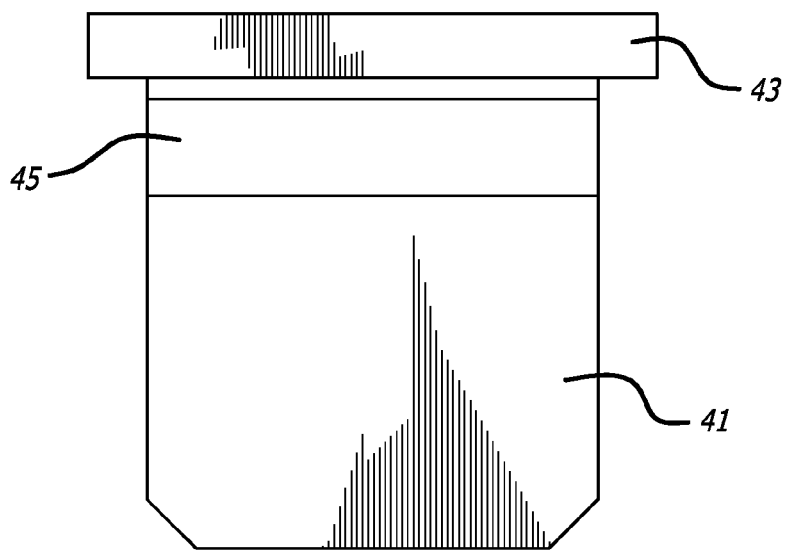
FIG. 7 is a front elevational view of the barrier assembly of the loading assembly of FIG. 1.
Figure 8:
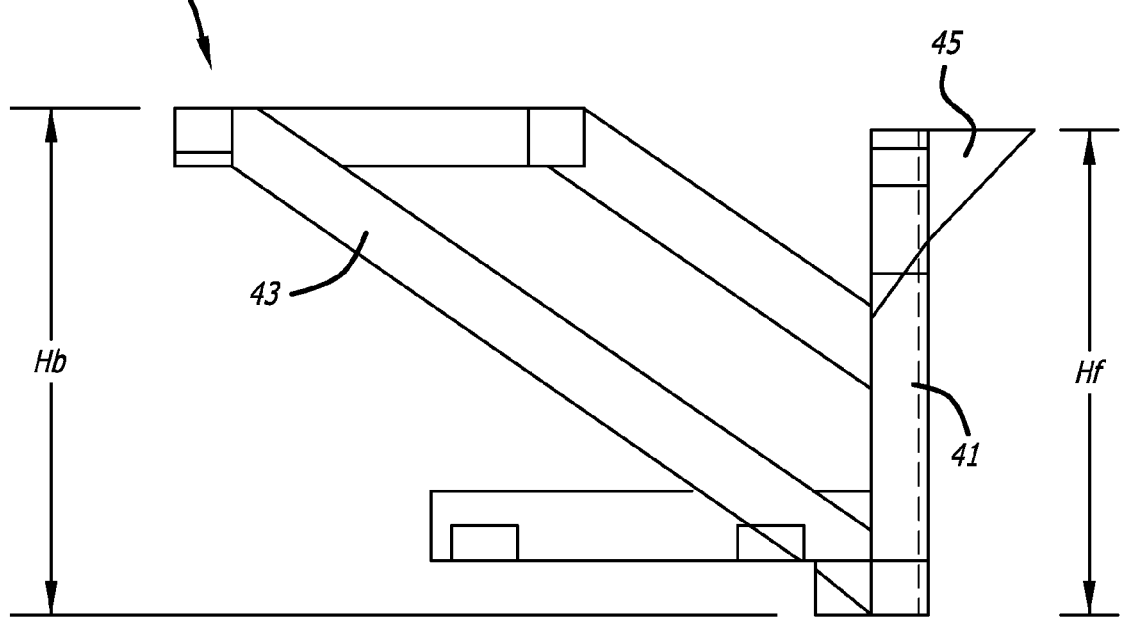
FIG. 8 is a side elevational view of the barrier assembly of the loading assembly of FIG. 1.
Figure 11:
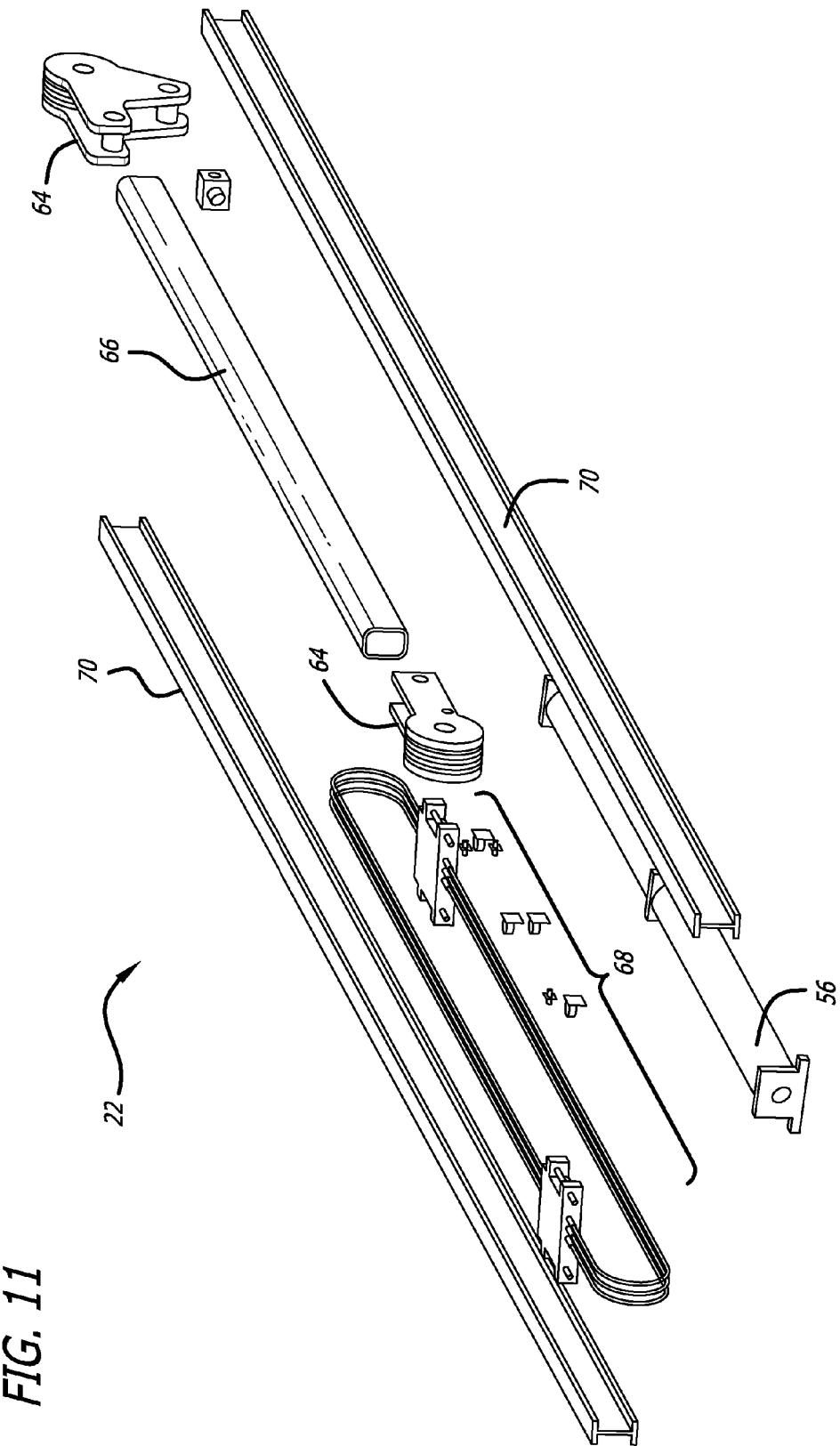
FIG. 11 is an exploded perspective view of the drive mechanism of the loading assembly of FIG. 1.

With reference now to FIGS. 7 and 8, the barrier 24 includes a leading wall 41 attached to a brace 43. The leading wall is configured to conform to the interior dimensions of the load bin and includes a forward projection 45 that aids in confining the bulk material 12 in front of the leading wall throughout operation of the loading assembly. In the exemplary embodiment, the leading wall has a height ($H_f$) of about 6 ft., 8 in. while the overall height ($H_b$) of the barrier is about 7 ft., 6 in. The upper portion of the barrier extends out the open top 21 of the load bin and is guided along the support structure 16.

As shown in FIGS. 1-4, the gate 26 of the load bin 18 includes two doors 44 hinged to corresponding sidewalls 32 and a locking mechanism for securing the doors closed. During loading and transfer of the bulk material, the gate is configured to remain secure. Once the load bin is fully inserted into the container, the gate is unsecured, enabling the load to remain in the container upon withdrawal of the load bin.

In the exemplary embodiment, the locking mechanism is released by remote activation initiated by the operator; however, various other approaches can be used, e.g., hydraulic or electric linkage to open, gravity to open, or spring loaded. Moreover, other approaches can be used for allowing the load to remain in the container upon removal of the bin. For example, various gate configurations can be used, such as, rolling track doors and horizontally hinged doors. Also, sacrificial doors can be used, e.g., in which the door is configured to remain in the container or to deteriorate or to be destroyed upon retraction of the load bin.

In yet other embodiments, the load bin can be configured without a gate. Instead, material can be positioned to serve as a sacrificial end wall such that it remains in the bin during transfer and remains in the container upon removal of the load bin. For example, a large piece of scrap steel can be position near the open end in manner that retains the material within the bin during loading yet allows the load to remain within the container during retraction. In selected embodiments, the floor of the load bin can be configured to be movable relative to the side walls such that the floor can be displaced while within the container, allowing the load to remain in the container.

Figure 2:
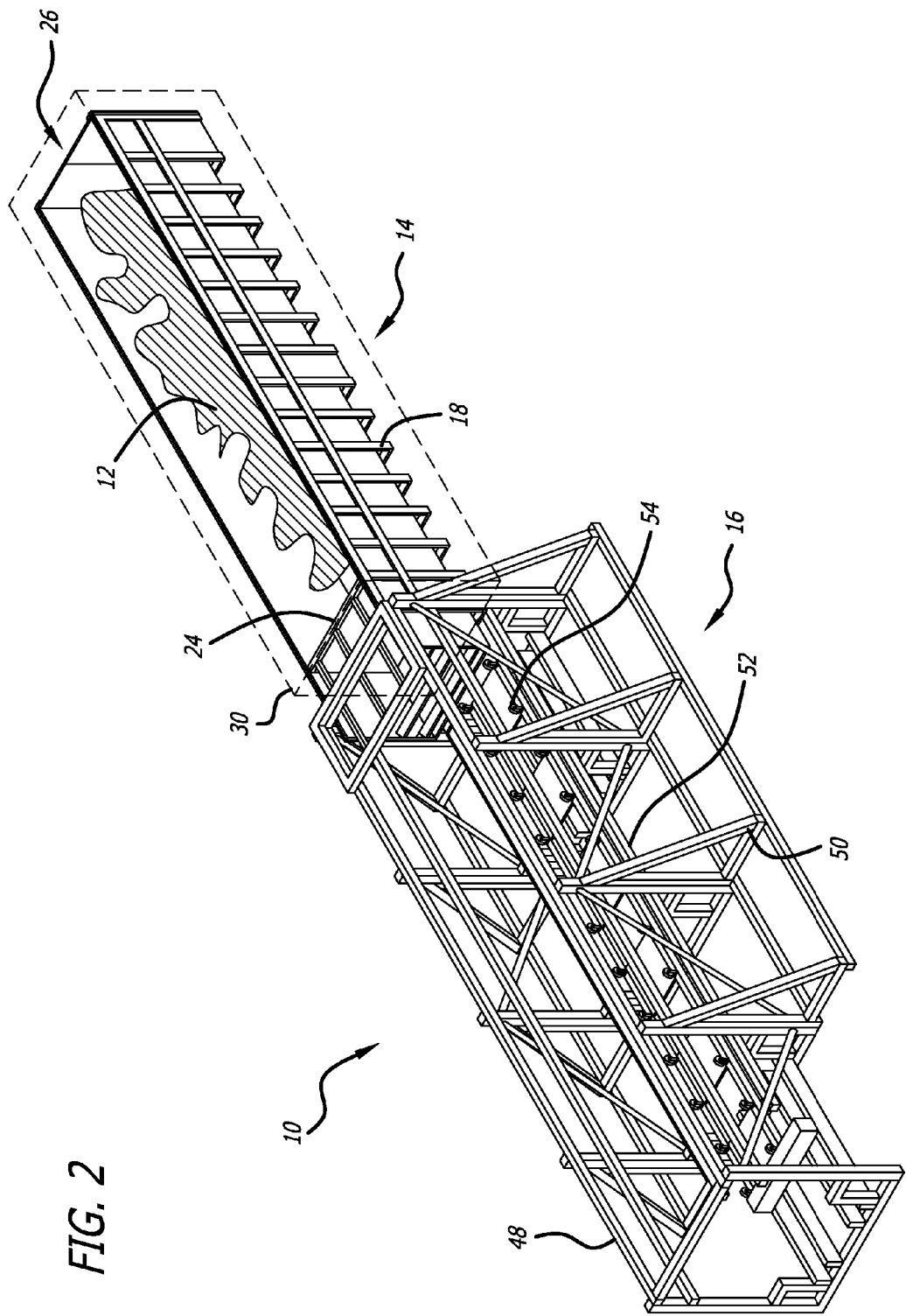
FIG. 2 is a perspective view of the loading assembly of FIG. 1, depicting the load bin fully extended into the container (in phantom) and a barrier assembly disposed adjacent to the opening of the container.

With reference now to FIG. 2, the support structure 16 is configured to promote stability of the load assembly 10 during all phases of operation in the exemplary embodiment, the loading assembly is configured to transfer a load of in excess of about 58,000 pounds (approx. 26,300 kg). The support structure includes external framing 48 disposed about the load bin 18, side buttresses 50, and a base support 52. The load assembly can be disassembled for transportation, if desired. The support structure can be disassembled and housed within the load bin. The overall weight of the load assembly is less than 42,000 pounds, making it convenient for transport.

The base support 52 is positioned below the bottom wall 34 (FIG. 5) of the load bin 18 and includes a plurality of rollers 54 to facilitate longitudinal movement of the load bin. In the exemplary embodiment, the base support is integrated with a weight scale (not shown) to provide weight measurement of the load. Optionally, the base support can be configured to move in support of operation of the load assembly. For example, the load assembly can be configured to aid in aligning the load bin with the container, e.g., via movement of the base support, including lateral and vertical adjustments. Also, the base support can be configured to tilt and vibrate to facilitate in dispensing the load within the container.

With reference to FIGS. 1-4 and 9-11, the drive mechanism 22 is configured urge the load bin 18 into and out of the container 14, through the transfer and retraction phases, in a timely manner. The drive is attached to the support structure 16 and the load bin and provides a cycle time through the transfer and retraction phases of less than about eight minutes. The drive mechanism includes a hydraulic cylinder 56 and a cable assembly 58 operatively connected to the load bin. The hydraulic cylinder includes a piston 60 disposed in a cylinder housing 62. The cable assembly includes pulley blocks 64 disposed on opposite ends of a support beam 66 with cabling 68 looped around the pulley blocks.

The drive mechanism 22 is aligned between two guide beams 70 (FIG. 11) below the bottom wall of the load bin 18. As best seen in FIGS. 9 and 10, the hydraulic cylinder displaces the cable assembly and, in turn, the load bin. The piston 60 of the hydraulic cylinder can extend over 20 feet out the cylinder housing 62. The cable assembly is configured to translate every one foot of movement by the hydraulic cylinder into two feet of movement of the load bin. Thus, the cable assembly further displaces the load bin approximately 20 feet, additionally, totaling about 40 feet of displacement for the load bin.

In the exemplary embodiment, a hydraulic drive mechanism is used; however, various other drive mechanisms can be used, e.g., electric, gas or diesel engine. Moreover, various other approaches can be used for translating the force from the drive mechanism in to movement of the load bin, e.g., piston, rack and pinion, belt drive, cable/drum, chain/sprocket, and gear reduction.

Container Support Assembly

Figure 12:
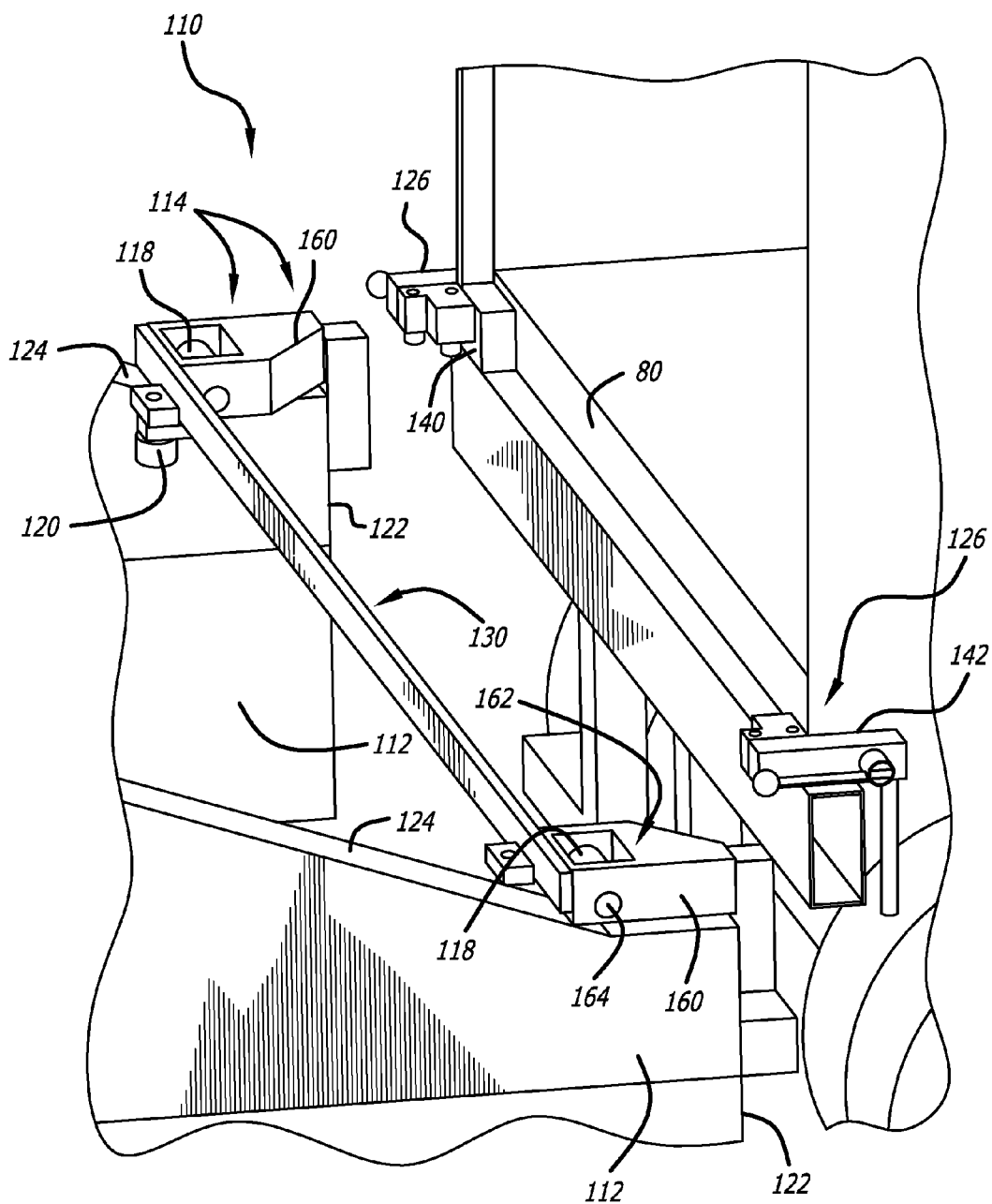
FIG. 12 is a close-up, perspective view of the container support assembly of FIG. 1, depicting a roller assembly disposed on two ramps.
Figure 13:
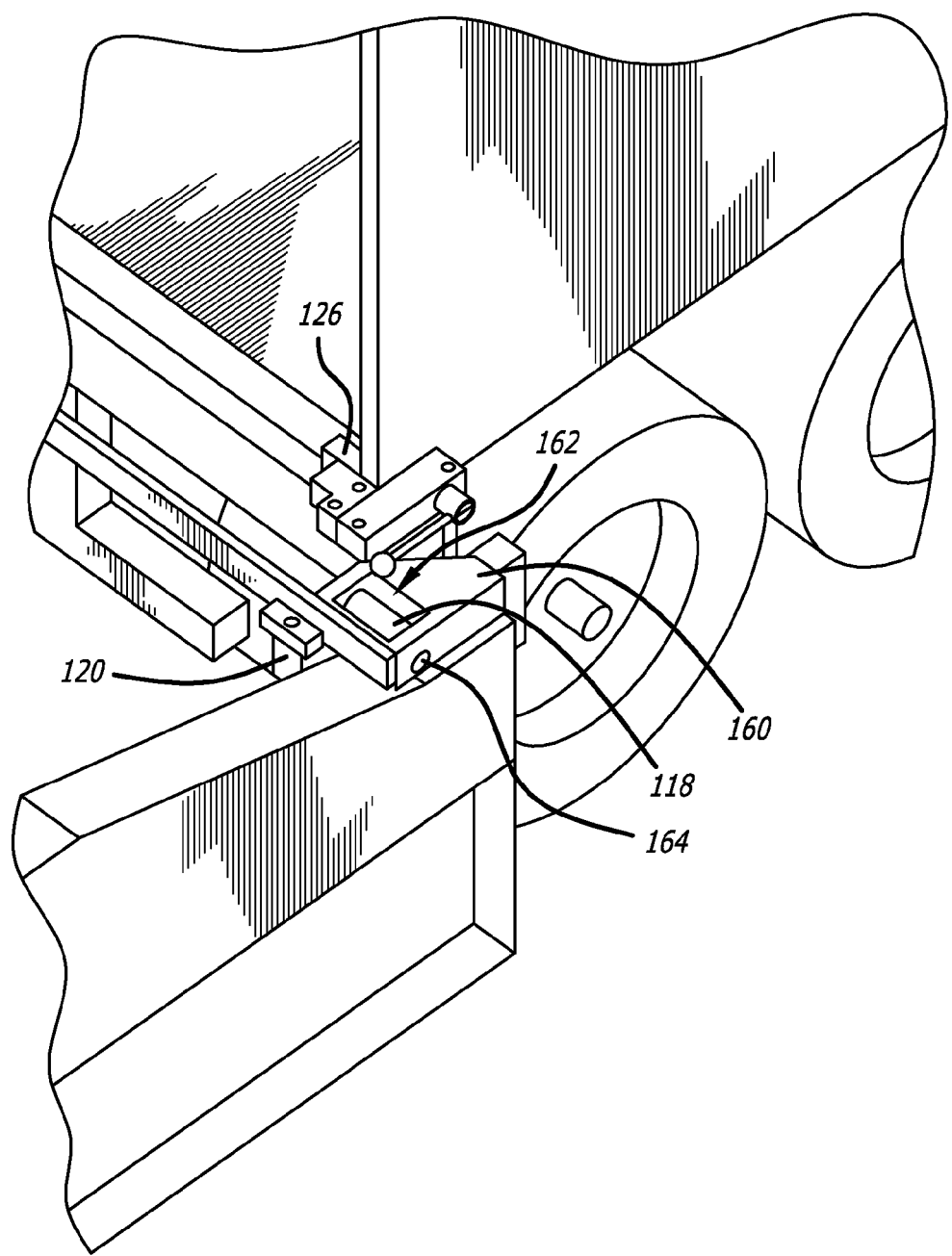
FIG. 13 is a close-up, perspective view of the container support assembly of FIG. 1, depicting a corner block assembly engaging the roller assembly.
Figure 14:
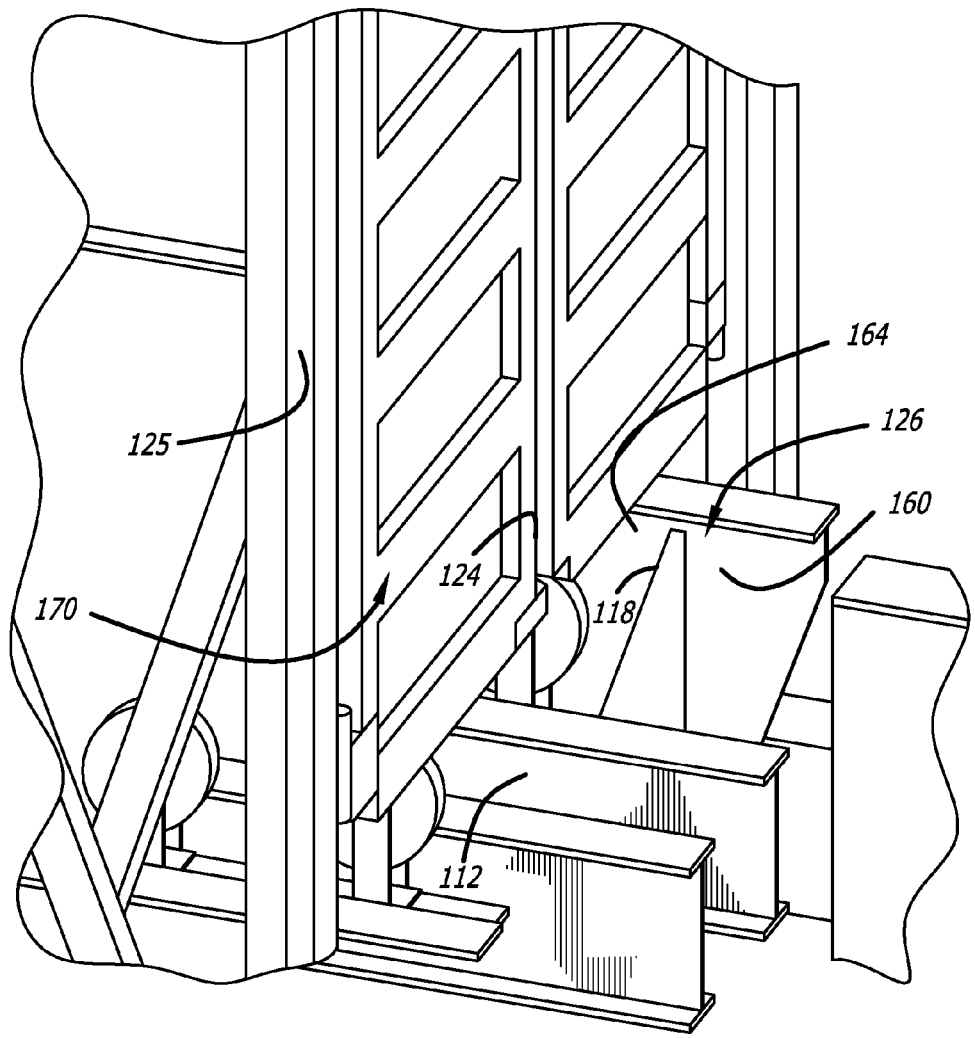
FIG. 14 is a perspective view of the container support assembly of FIG. 1, depicting the roller assembly at an intermediate point along the ramps.

With reference now to FIG. 12, the container support assembly 110 is attached to the loading assembly 10 to facilitate alignment and stable support of the container 14 throughout the loading process. The container is positioned atop a flatbed trailer 80, as known in the art. The container support assembly includes two ramps 112 and an interface assembly 114 that aids in transferring the load of the container onto the ramps, in use. The ramps are spaced apart on a level reinforced concrete slab (not shown), allowing the trailer to back into position between the ramps.

The interface assembly 114 includes two corner block assemblies 126 that couple to lower corners of the container 14 further includes a roller assembly 130. In use, the roller assembly is configured to engage the ramps and interface with the block assemblies such that a substantial portion of the container's load is borne by the ramps, rather than the suspension system 82 of the trailer.

In use, the trailer 80 is backed between the ramps 112, causing the corner block assemblies 126 to engage the roller assembly 130, pushing the roller assembly up the ramps. As the interface assembly 114 rolls up the ramps, it increasingly supports the container. The trailer is backed up until the floor 20 of the container 14 is on plane to receive the load bin 18. Once in position, the container support assembly 110 bears a substantial portion of the load, rather than the suspension system of the flatbed.

In this manner, the container support assembly 110 ensures precise alignment of the container 14 and the load bin despite variations in height across different flatbed trailers. Moreover, the container support assembly 110, rather than the suspension system of the flatbed, bears a substantial portion of the load, thereby inhibiting changes in alignment of the load bin and container as the bulk material 12 transferred into the container. Without the container support assembly, the suspension system of the flatbed would tend to absorb the increased load, particularly as the load bin with the bulk material is inserted in to the container. This could cause misalignment between the load bin and the container, resulting in undue stress on the loading assembly.

The ramps 112 extend from the support structure 16 and are in spaced relationship with each other, to allow the flatbed trailer 80 to be positioned between the ramps. In the exemplary embodiment, the ramps are formed of steel; however, various other materials having sufficient strength to endure the loads anticipated can be used. The ramps each include a first end 122 and a level portion 125, adjacent to the support structure 16. The level portion is positioned such that the open end of the container is properly positioned to receive the load bin 18. With the interface assembly attached to the container and positioned on the level portion of the ramps, the container floor is at a proper height to receive the load bin, and the container support assembly 110, rather than the suspension system of the flatbed, bears a substantial portion of the load.

Figure 15:
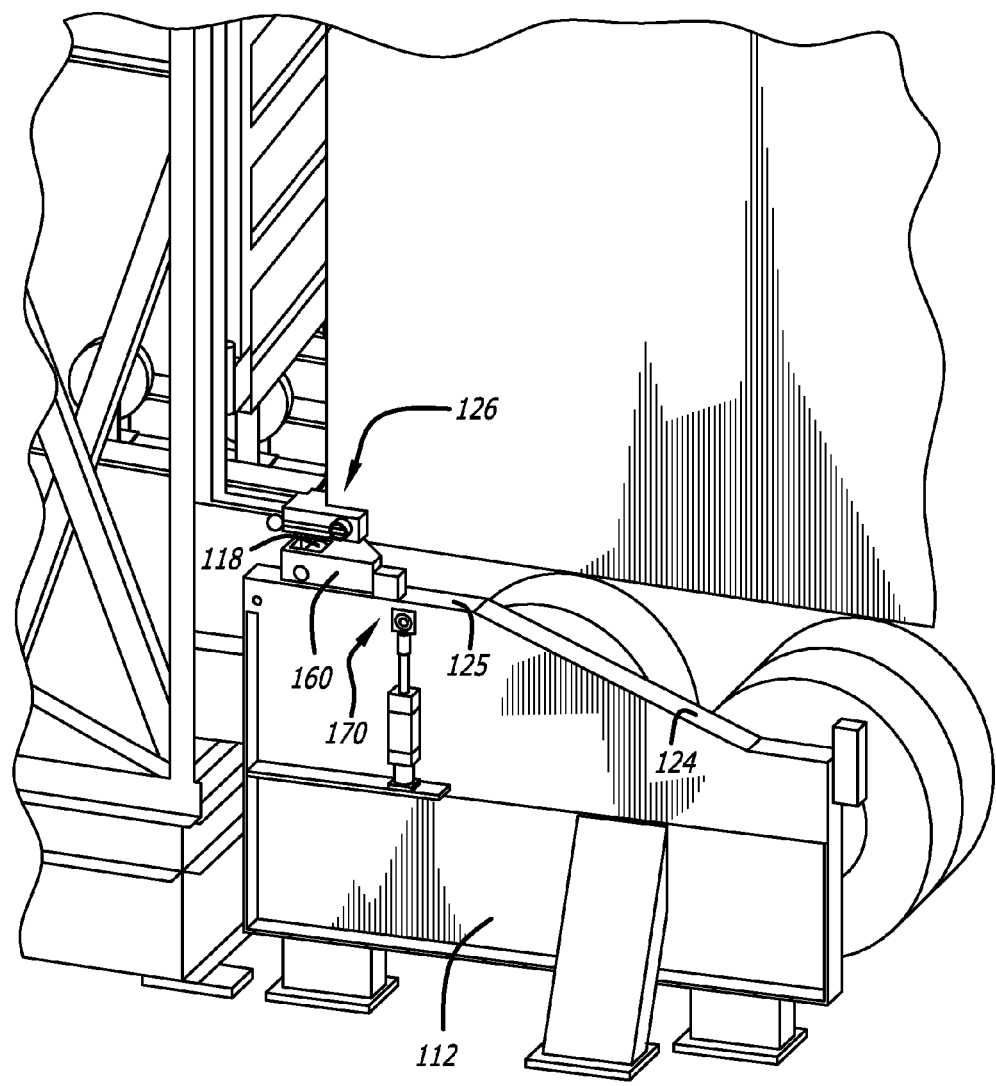
FIG. 15 is a perspective view of the container support assembly, similar to FIG. 14, depicting the roller assembly at proximal end of the ramps.

With the open end of the container 14 is supported on the level portion 125 of the ramps via the interface assembly 114, a locking structure 170 (FIG. 15) of the ramps can be engaged. The locking mechanism provides an additional measure of safety during the loading process. In the exemplary embodiment, the locking structure is hydraulic, though other locking mechanisms can be used, or excluded entirely, as appropriate.

In the exemplary embodiment, the support surfaces 124 are angled relative to the concrete slab. In other embodiments, the concrete slab can slope downward between the ramps 112. In such embodiments, an increasing height differential between the upper surface of the ramp and the concrete slab is achieved, at least in part, via a downward slope of the slab.

Figure 16:
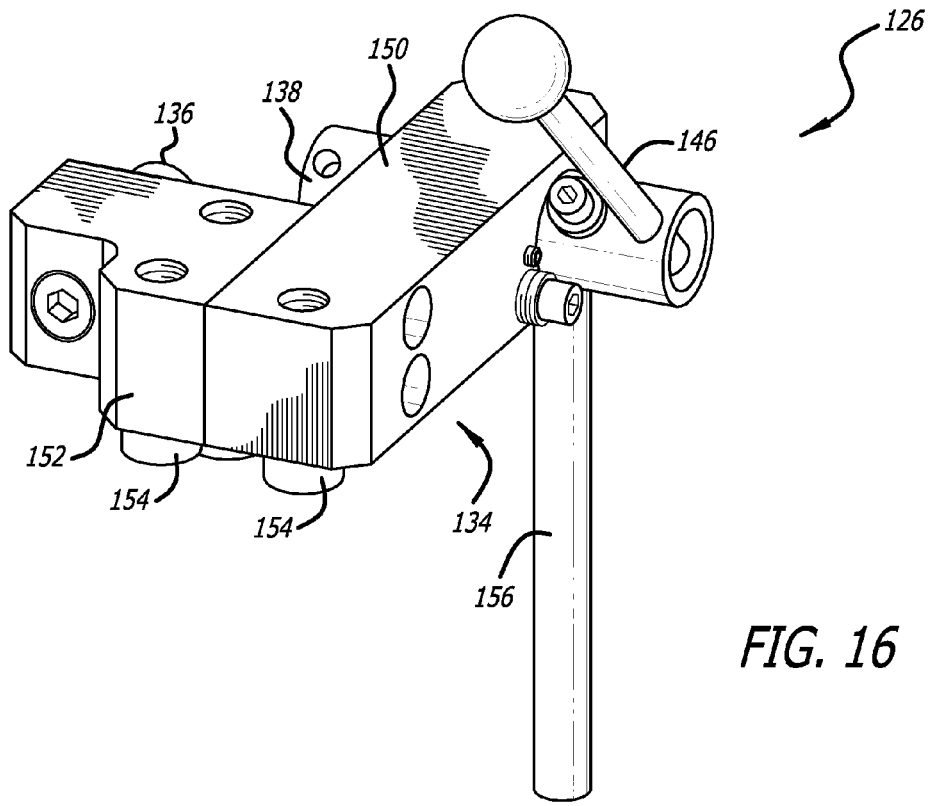
FIG. 16 is a perspective view of an end of the roller assembly of FIG. 12.
Figure 17:
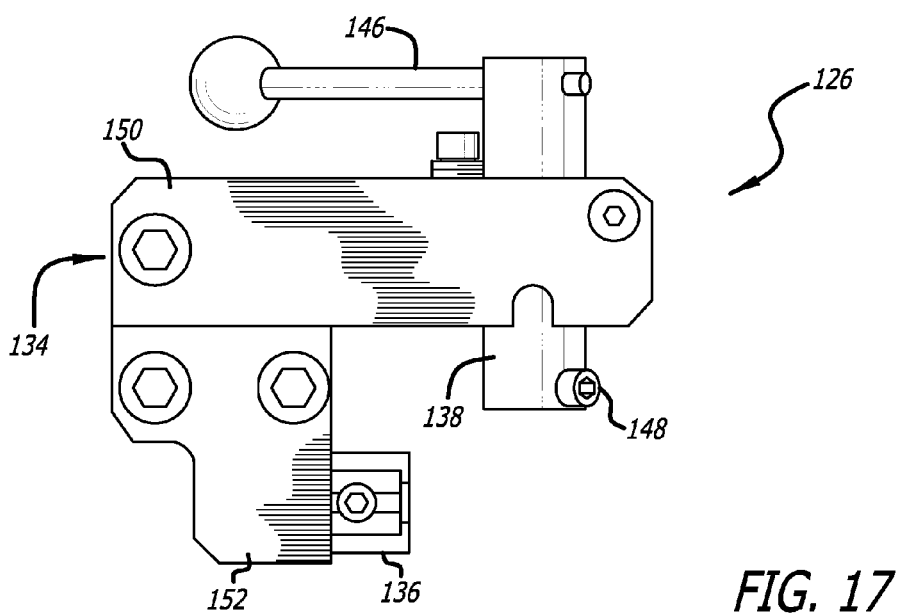
FIG. 17 is a perspective view of the corner block assembly of FIG. 12.
Figure 18:
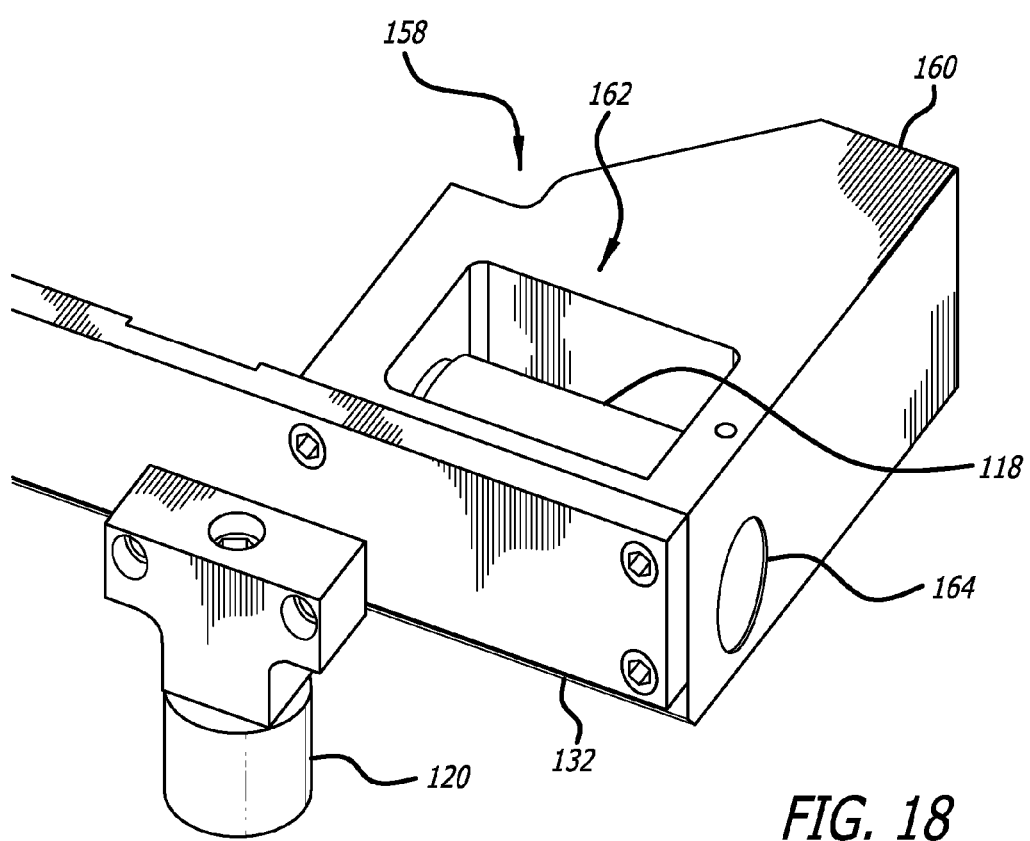
FIG. 18 is a top plan view of the corner block assembly of FIG. 12.

With reference to FIGS. 16 and 17, the corner block assemblies 126 each include an L-shaped body 134 an end support bar 136, and a side support bar 138. Both support bars are formed of 1045 steel, cold drawn. In other embodiments, the body can be formed as one or several pieces and of different material. The support bars engage end and side support openings 140, 142, respectively, (FIG. 12) defined in the corners of the container. In the exemplary embodiment, the end support bar is fixed in place and is sized to be received within the end opening 140 (FIG. 12). The side support bar 138 is configured to be received within the side opening 142 (FIG. 12) of the container.

The side support bar 138 extends through a bore defined by the body 134 and is operated by a lever 146 for axial and rotational movement. Using the lever, a user moves the side support bar axially into the side opening of the container 80. Then, the user rotates the lever such that a catch 148 on an end of the side support bar engages a wall of the side opening, keeping the corner block assembly in place.

In the exemplary embodiment, the body 134 of each corner block assembly 126 includes a side block 150 and an end block 152 attached to each other. Both the side block and the end block are formed of 7075-T651 aluminum. In other embodiments, the body can be formed as one or several pieces and of different material.

The corner block assemblies 126 further include three posts that extend downward from the body 134, forward posts 154 and stop post 156. The posts are disposed adjacent to the end of the container and aid in alignment and engaging the roller assembly 130. The forward posts are of sufficient length to interface with a notch 158 defined by support blocks 160 of the roller assembly.

The stop posts 154 of the corner post assemblies 126 extend downward from the body 134. The stop post is substantially longer than the forward posts 154. As the trailer is backed between the ramps, the stop posts engage the support blocks of the roller assembly, pushing it up the ramps 112. Once the roller bar is at a sufficient height, the support blocks will press against the corner block assemblies, thereby supporting the container onto the ramps.

The roller assembly 130 includes a support 132 that extends between the two sets of horizontal and vertical rollers 118, 120. The roller assembly is sized such that the rollers align with the ramps 112. The vertical rollers extend downward from the support and are spaced from each other to provide an acceptable measure of alignment tolerance, as the trailer is backed between the ramps.

The post configuration facilitates engagement of the corner assemblies 126 and the roller assembly 130 without requiring precise alignment, at least initially. For example, the container need not be precisely aligned between the ramps to enable engagement of the corner assemblies and the roller assembly. As the container backs into place, the posts will contact the roller assembly. If necessary, the roller assembly will shift laterally until the forward posts 154 engage the notches 158. As the container continues to back up, the roller assembly will ride up the ramps, transferring load on to the ramps.

Each horizontal roller 118 is housed in an opening 162 of the support blocks 160 attached to the support 132. The support block is formed of carbon steel (A36) and is configured to receive a pin 164 that extends through the opening for supporting the horizontal roller. The pin and the roller are both formed of 1045 steel, cold drawn; although, in other embodiments, one or several pieces and of different material can be used, as appropriate.

Embodiments of the container support assembly are particularly useful with loading assemblies for transport containers, as described in co-pending U.S. patent application Ser. No. 10/964,384, filed Oct. 12, 2004, now U.S. Pat. No. 7,172,382, which is herein incorporated by reference. Embodiments of the container support assembly are also useful in other applications that can benefit from providing a convenient and stable support.

It should be appreciated from the foregoing that the present invention provides a loading assembly configured to load transport containers with bulk material quickly and efficiently. A container support assembly is also provided that facilitate alignments and stable support of the container throughout the loading process.

Although the invention has been disclosed in detail with reference only to the exemplary embodiments, those skilled in the art will appreciate that various other embodiments can be provided without departing from the scope of the invention. Accordingly, the invention is defined only by the claims set forth below.

The invention claimed is:

1. A loading assembly for use with a transport container having an open end and a predetermined load capacity, comprising:
   a load bin sized to be inserted into a transport container through an open end thereof, from a retracted position, external of the transport container, to an inserted position, internal of the transport container, the load bin having a floor and two side walls and a movement aid beneath the floor configured to ease movement of the load bin between a retracted position, external of the transport container, and an inserted position, internal of the transport container;
   a barrier assembly including a movable wall disposed within the load bin, the wall being movable relative to the load bin, wherein the load bin and the barrier assembly cooperate to define a volume equal to the predetermined load capacity and configured to hold a load of bulk material of sufficient size to fill the transport container to the predetermined load capacity in a single operation, and wherein the load bin and the barrier assembly further cooperate to define a top opening for receiving the load;
   a support structure supporting the load bin and the barrier assembly, the support structure comprising frame members fixed relative to a support surface at least during loading assembly operation, and wherein the movement aid engages the floor of the load bin during movement of the load bin between the retracted and inserted positions; and
   a drive mechanism configured to engage one of the load bin and the transport container operable to position and move the load bin relative to the transport container and the supporting structure between the inserted and retracted positions, wherein insertion occurs through the open end of the container such that the load bin is substantially within the container and retraction occurs to separate the load bin from the container, the drive mechanism includes a hydraulic cylinder and a cable assembly coupled to the hydraulic cylinder and to the load bin;
   wherein the barrier assembly is configured to lock the movable wall in a fixed position relative to the container, adjacent to the open end of the container when the load bin is positioned in the transport container, such that when the drive mechanism thereafter moves the load bin from the inserted position to the retracted position, the movable wall of the barrier assembly retains the bulk material load within the container.

2. A method of loading a transport container, comprising:
   positioning a transport container having a predetermined load capacity and a loading assembly relative to one another such that the loading assembly is disposed adjacent to an open end of the container, the loading assembly including
   a load bin including a floor and two side walls, wherein the bin is movable relative to the transport container between a retracted position, external of the transport container, and an inserted position, internal of the transport container,
   a barrier assembly having a movable wall disposed within the load bin, the movable wall being movable relative to the load bin, wherein the load bin and the barrier assembly cooperate to define a volume configured to hold a bulk material load of sufficient size to substantially fill the transport container to the predetermined load capacity in a single operation, and wherein the load bin and the barrier assembly further cooperate to define a top opening for receiving the bulk material load, and
   support structure supporting the load bin and the barrier assembly, wherein the support structure is stationary during loading assembly operation,
   defining the predetermined maximum loading capacity by positioning the barrier assembly along the load bin, wherein the step of defining the predetermined maximum loading capacity further comprises positioning the barrier assembly relative to and within the load bin therealong to the volume configured to hold the bulk material load of sufficient size to substantially fill the transport container to the predetermined maximum capacity in the single operation;
   loading the load bin with a bulk material load through the top opening;
   positioning the load bin relative to the transport container through the open end thereof to the inserted position such that the load bin and the unpalletized load are disposed within the container; and engaging the movable wall of the barrier assembly with the support structure to lock the movable wall in a fixed position with respect to the bulk material load and with said wall being adjacent the open end of the transport container while repositioning the load bin and the transport container relative to each other from the inserted position with the load bin internal of the container to the retracted position external of the container such that the load bin again is disposed adjacent to the open end of the transport container, while the bulk material load remains disposed within the transport container.

3. A method as defined in claim 2, wherein:
the loading assembly further includes a drive mechanism operable to separate the load bin relative to the transport container during the step of engaging.

4. A method as defined in claim 3 wherein the step of positioning includes operating the drive mechanism so as to move the load bin into the transport container through the open end thereof until the bulk material load is fully disposed within the transport container, while the transport container is maintained generally stationary; and
the step of engaging further includes operating the drive mechanism so as to separate the load bin from the transport container, while the barrier assembly remains engaged with the load, such that the load remains within the transport container.

5. A method as defined in claim 4, further comprising:
disengaging the barrier assembly from the support structure; and
sliding the barrier assembly to a retracted position, disposed within the load bin.

6. A method as defined in claim 4, wherein the drive mechanism includes a hydraulic cylinder and a cable assembly coupled to the hydraulic cylinder and to the load bin.

7. A method as defined in claim 2, wherein the support structure includes side supports disposed on opposing sides of the load bin.

8. A method as defined in claim 7, wherein the barrier assembly further includes a brace coupled to the wall of the barrier assembly and supported by the side supports of the support structure.

9. A loading assembly for use with a transport container having an open end, comprising:
a load bin sized to be inserted into a transport container having a predetermined load capacity through an open end thereof, from a retracted position, external of the transport container, to an inserted position, internal of the transport container, the load bin including a floor and two side walls;
a barrier assembly including a movable barrier wall disposed within the load bin that conforms to the internal dimensions of the load bin, and further including a brace coupled to the barrier wall, the barrier wall being movable relative to the load bin;
wherein the load bin and the barrier assembly cooperate to define a volume configured to hold a bulk material load of sufficient size to fill the transport container to the predetermined capacity in a single operation, the barrier wall being positioned along the load bin at a position corresponding to the predetermined load capacity and wherein the load bin and the barrier assembly further cooperate to define a top opening for receiving an unpalletized load;
a support structure disposed about the load bin, the support structure comprising frame members fixed relative to a ground support surface during loading assembly operation, the support structure including a movement aid beneath the load bin engaging the load bin for easing movement of the load bin between the inserted and retracted positions; and
a drive mechanism configured to engage one of the load bin and the transport container operable to position the load bin relative to the transport container from the inserted position with the load bin internal of the container to the retracted position external of the container through the open end of the container such that the load bin is substantially within the container and to separate the load bin from the container, the drive mechanism includes a hydraulic cylinder and a cable assembly coupled to the hydraulic cylinder and to the load bin;
wherein the barrier assembly is configured to lock the movable wall in a fixed position relative to the bulk material load in the load bin adjacent to the open end of the transport container and retain the load within the transport container when the drive mechanism moves the load bin from the inserted position in the container to the retracted position adjacent the open end of the transport container.

* * * * *